Figure 1:
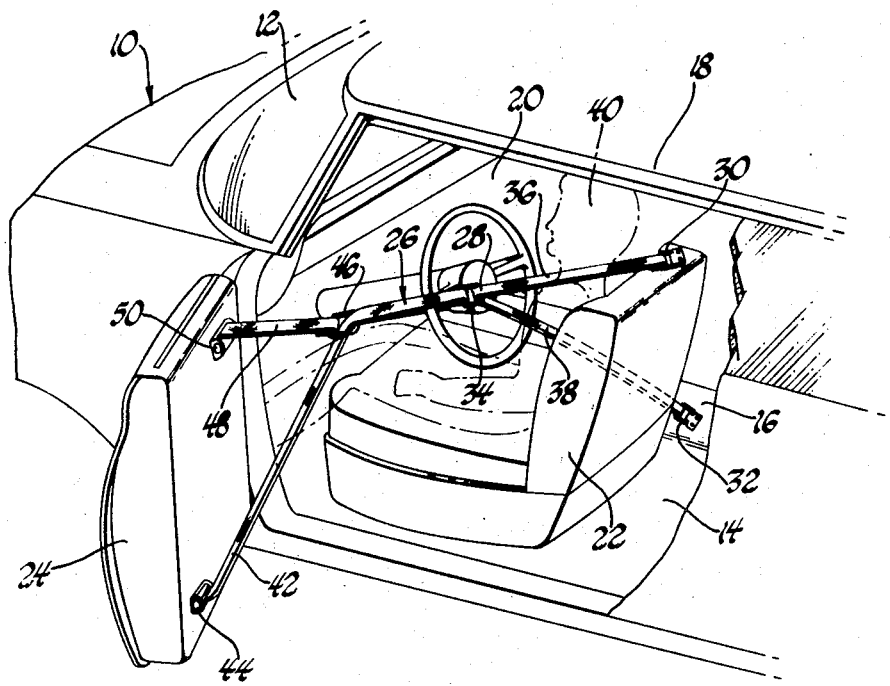

United States Patent

Weststrate

[15] 3,679,229
[45] July 25, 1972

[54] VEHICLE PASSIVE OCCUPANT RESTRAINING BELT ARRANGEMENT

[72] Inventor: Willem J. J. Weststrate, Washington, Mich.

[73] Assignee: General Motors Corporation, Detroit, Mich.

[22] Filed: Feb. 25, 1971

[21] Appl. No.: 118,604

[52] U.S. Cl..........................280/150 SB, 297/388, 297/389
[51] Int. Cl.........................................................B60r 21/10
[58] Field of Search............280/150 SB; 296/65 A; 297/285, 297/388, 389

[56] References Cited

UNITED STATES PATENTS

| | | | |
|---|---|---|---|
| 2,937,882 | 5/1960 | Oppenheim | 280/150 SB |
| 3,348,881 | 10/1967 | Weman | 280/150 SB X |
| 3,583,726 | 6/1971 | Lindblau | 280/150 SB |

Primary Examiner—Benjamin Hersh
Assistant Examiner—Winston H. Douglas
Attorney—W. E. Finken and Herbert Furman

[57] ABSTRACT

A vehicle passive occupant restraining belt arrangement includes a first belt whose one end is fixed to the upper inboard portion of a vehicle seat and whose other end is fixed adjacent the lower inboard portion of the seat, a first apertured member slidably receiving an intermediate portion of the first belt such that the first belt defines shoulder and lap belt portions, a second belt having one end fixed to the first apertured member and the other end received by a conventional inertia retractor mounted adjacent the lower rear portion of a vehicle body door, a second apertured member slidably receiving an intermediate portion of the second belt, and a control belt having one end attached to the second apertured member and the other end received by a control retractor also mounted on the vehicle door. When the door is in closed position, the inertia retractor retracts the second belt to maintain the first apertured member in a lower rearward position to position the shoulder and lap belt portions in occupant restraining positions. During movement of the door to open position, the control retractor retracts the control belt as the second apertured member slides along the second belt and moves the first apertured member from the lower rearward position to an upper forward position moving the shoulder and lap belt portions from the occupant restraining positions to easy-enter positions allowing convenient occupant access to the vehicle seat. During closing movement of the door, the control retractor protracts the control belt as the inertia retractor retracts the second belt moving the first apertured member from the upper forward position to the lower rearward position positioning the shoulder and lap belt portions in the occupant restraining positions.

1 Claim, 2 Drawing Figures

PATENTED JUL 25 1972 3,679,229

INVENTOR.
Willem J.J. Weststrate
BY
Herbert Furman
ATTORNEY

VEHICLE PASSIVE OCCUPANT RESTRAINING BELT ARRANGEMENT

This invention relates to a vehicle passive occupant restraining belt arrangement.

It is known to provide a vehicle occupant restraining belt arrangement in which a carrier is slidably mounted on a vehicle body door and is secured to a belt which is moved between easy-enter and occupant restraining positions in response to door movement. It is also known to provide a vehicle occupant restraining belt arrangement including a belt having one end received by a door mounted retractor.

This invention provides a vehicle passive occupant restraining belt arrangement in which a door mounted control retractor is responsive to door movement and cooperates with a door mounted inertia retractor to move the belt arrangement between occupant restraining and easy-enter positions.

In the preferred embodiment of the invention, a first belt has one end secured to an upper inboard portion of a vehicle seat, the other end secured adjacent a lower inboard portion of the seat and an intermediate portion slidably receiving a first apertured member to define shoulder and lap belt portions. A second belt has one end attached to the first apertured member, the other end received by a conventional inertia retractor mounted on the lower rear portion of the vehicle door, and an intermediate portion slidably receiving a second apertured member. A control belt has one end secured to the second apertured member and the other end received by a control retractor mounted on the vehicle body door and responsive to door opening and closing movement. During opening movement of the door, the control retractor retracts the control belt to cause the second belt to move the first apertured member from a lower rearward position, in which the shoulder and lap belt portions are maintained in occupant restraining positions, to an upper forward position, in which the shoulder and lap belt portions are maintained in easy-enter positions. During closing movement of the door, the control retractor protracts the control belt and allows the inertia retractor to retract the second belt and move the first apertured member to the lower rearward position and the shoulder and lap belt portions to the occupant restraining positions.

One feature of this invention is that it provides a vehicle passive occupant restraining belt arrangement in which a door mounted control retractor retracts a control belt during door opening movement to move shoulder and lap belt portions to easy-enter positions. Another feature of this invention is that during door closing movement, the control retractor protracts the control belt and a door mounted inertia retractor retracts a belt attached to the shoulder and lap belt portions to move the belt portions to occupant restraining positions.

Figure 2:
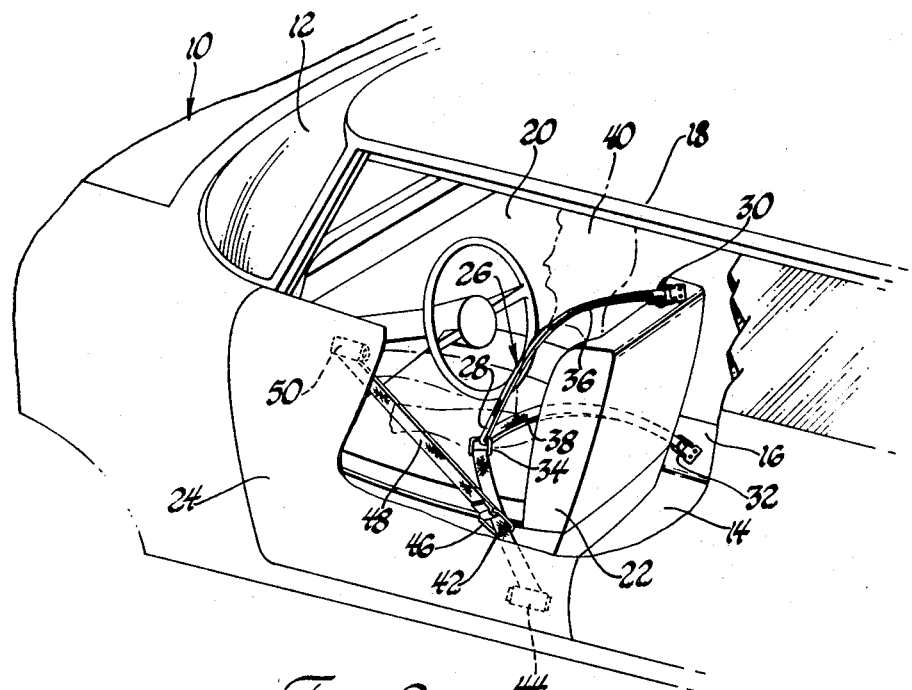

These and other features of this invention will be readily apparent from the following detailed description and drawings in which:

FIG. 1 is a perspective view of a portion of a vehicle body including a belt arrangement according to the invention shown in an easy-enter position with the vehicle body door in open position; and FIG. 2 is a partially broken away perspective view of a portion of a vehicle body as in FIG. 1 but with the door shown in closed position and the belt arrangement in an occupant restraining position.

Referring now to the drawings, a vehicle body is generally indicated by 10 and includes a conventional windshield 12, a vehicle body floor 14 with a conventional transmission tunnel 16, and a roof 18 that cooperate to define an occupant compartment 20 in a conventional manner. A conventional vehicle seat 22 is mounted within the occupant compartment 20 in the usual manner and is accessible through the vehicle body door opening selectively opened and closed by a vehicle body door 24 whose front edge is pivoted to the vehicle body 10.

A passive occupant restraining belt arrangement according to the invention is generally indicated by 26 and includes a first belt 28. One end of belt 28 is secured to the upper inboard portion of the back of seat 22 by an attachment 30 and the other end is secured to the transmission tunnel 16, generally below the attachment 30, by an attachment 32. An intermediate portion of belt 28 is slidably received within a rectangular ring member 34 such that belt 28 defines a shoulder belt portion 36 and a lap belt portion 38 that cooperate to restrain a phantom line indicated seated occupant 40, as will be described. A second belt 41 has one end secured to ring member 34 and the other end received by a conventional inertia retractor 44 mounted adjacent the lower rear portion of the door 24 with the intermediate portion of belt 42 slidably receiving a control ring member 46. A control belt 48 has one end attached to ring member 46 and the other end received by a control retractor 50 mounted on door 24 above the forward of inertia retractor 44. Control retractor 50 retracts and protracts control belt 48 in response to movement of door 24, as will be described.

When door 24 is in the FIG. 2 closed position, the control belt 48 is protracted from the control retractor 50 such that the inertia retractor 44 is free to retract belt 42 to maintain ring member 34 in a lower rearward position maintaining the shoulder belt portion 36 angularly disposed across the chest of occupant 40 and the lap belt portion 38 disposed across the lap of the occupant, both of the belt portions thus being disposed in occupant restraining positions. During opening movement of the door 24, a suitable drive mechanism, not shown, actuates control retractor 50 in a retracting direction to retract control belt 48 and initially cause ring member 46 to slide toward ring member 34 along belt 42 as inertia retractor 44 allows protracting movement of belt 42. The door opening movement, of course, must be at a rate below that which will cause the protracting movement of belt 42 to lock inertia retractor 44. During subsequent opening movement of door 24, the sliding direction of ring member 46 along belt 42 reverses and ring member 46 begins to move away from ring member 34. When the door reaches the FIG. 1 open position, the retraction of control belt 48 causes belt 42 to position the ring member 34 in an upper forward position such that shoulder and lap belt portion 36 and 38 are positioned in easy-enter positions allowing convenient occupant egression from the vehicle body 10.

When the door 24 is moved from the open position of FIG. 1 toward the closed position of FIG. 2, the control retractor 50 is actuated by the drive mechanism to protract the control belt 48. Consequently, during door closing movement, the inertia retractor 44 is free to retract belt 42 and move the ring member 34 from the upper forward position of FIG. 1 to the lower rearward position of FIG. 2 moving the shoulder and lap belt portions 36 and 38 to the occupant restraining positions without any effort on the part of the occupant.

The drive mechanism which actuates control retractor 50 may include a vehicle body mounted arcuate gear rack engageable with a door mounted rotatable pinion that is connected to the control retractor 50 by a flexible cable to actuate the control retractor in a retracting direction during door opening movement and in a protracting direction during door closing movement. It is also possible an electric motor drive which may be associated with a conventional power operated window regulator by a suitable clutch and control mechanism.

The invention thus provides an improved vehicle passive occupant restraining belt arrangement.

What is claimed is:

1. In combination with a vehicle body including a floor and a roof defining an occupant compartment in which is mounted a vehicle seat accessible through a vehicle body door opening selectively opened and closed by a vehicle body door whose front edge is pivotally secured to the vehicle body, a passive occupant restraining belt arrangement comprising, a first belt having one end fixed to an upper inboard portion of the seat and the other end fixed adjacent a lower inboard portion of the seat generally below the one end, a first apertured member slidably receiving an intermediate portion of the first belt to define a shoulder belt portion between the one end of the first belt and the first apertured member and to define a lap belt portion between the other end of the first belt and the first apertured member, a second belt having one end secured to the first apertured member, and inertia retractor mounted on the inboard lower rear portion of the door and receiving the other end of the second belt, the inertia retractor normally retracting the second belt with the door in closed position to maintain the first apertured member in a lower rearward position positioning the lap belt portion across the lap of a seated occupant and the shoulder belt portion across the chest of the seated occupant in restraining positions, retractable means mounted on the door forward and above the inertia retractor, an elongated flexible control member having one end received by the retractable means, a second apertured member slidably receiving the second belt and attached to the other end of the flexible control member, and coordinating means for actuating the retractable means in a retracting direction during door opening movement to retract the flexible control member and slide the second apertured member along the second belt moving the first apertured member from the lower rearward position to an upper forward position and the shoulder and lap belt portions from the restraining positions to easy-enter positions allowing convenient occupant access to the seat, the coordinating means actuating the retractable means in a protracting direction during door closing movement to protract the flexible control member as the second apertured member slides along the second belt and allows the inertia retractor to retract the second belt and move the first apertured member from the upper forward position to the lower rearward position moving the shoulder and lap belt portions from the easy-enter positions to the restraining positions with respect to the seated occupant.

* * * * *